(12) United States Patent
Lange

(10) Patent No.: US 6,249,100 B1
(45) Date of Patent: Jun. 19, 2001

(54) DRIVE CIRCUIT AND METHOD FOR AN ELECTRIC ACTUATOR WITH SPRING RETURN

(75) Inventor: Christopher M. Lange, New Hope, MN (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,005

(22) Filed: Jul. 31, 1997

(51) Int. Cl.[7] ................... H02P 3/18; H02P 7/74
(52) U.S. Cl. ............ 318/471; 318/430; 318/608; 318/609; 318/434
(58) Field of Search ................... 318/254, 471, 318/811, 455, 466, 472, 160–180, 430–480, 600–640; 363/41

(56) References Cited

U.S. PATENT DOCUMENTS

| | | |
|---|---|---|
| 3,931,557 | 1/1976 | Osburn . |
| 3,974,427 * | 8/1976 | Carson .................. 318/160 |
| 4,099,704 | 7/1978 | Okumura et al. . |
| 4,482,847 | 11/1984 | Rudich, Jr. et al. . |
| 4,584,511 | 4/1986 | Rudich, Jr. et al. . |
| 4,604,558 | 8/1986 | Hirsch . |
| 4,605,983 | 8/1986 | Harvey . |
| 4,613,798 | 9/1986 | Baumann . |
| 4,623,826 | 11/1986 | Benjamin et al. . |
| 4,677,355 | 6/1987 | Baumann . |
| 5,045,735 * | 9/1991 | Christiaens .............. 318/132 |
| 5,409,194 | 4/1995 | Blanc et al. . |

FOREIGN PATENT DOCUMENTS

3221048A1   8/1983   (DE) .

OTHER PUBLICATIONS

"HVAC Product News", Jan. 27, 1997, product description of model AF24–PWM offered by BELIMO Aircontrols (USA), Inc.

* cited by examiner

Primary Examiner—Paul Ip
(74) Attorney, Agent, or Firm—Charles L. Rubow

(57) ABSTRACT

A spring return rotary actuator incorporating a DC brush commutated electric motor and a pulse width modulation drive circuit which reduces the voltage at which current is supplied to the motor once a rotation sensor senses that the actuator output shaft has stalled. The drive circuit also includes a temperature responsive feature which increases the voltage at which current is supplied to the motor in the event a sensed temperature exceeds a temperature limit.

29 Claims, 2 Drawing Sheets

DRIVE CIRCUIT AND METHOD FOR AN ELECTRIC ACTUATOR WITH SPRING RETURN

BACKGROUND OF THE INVENTION

The present invention relates generally to an actuator system of the type in which an output shaft is spring returned to a rest position and, on command, is driven to and held at a different position by an electric motor. More particularly, the invention relates to such an actuator system employing a drive circuit and method which reduces power supplied to the motor when the output shaft is stalled away from its rest position.

It is well known, particularly in heating, ventilating and air conditioning (HVAC) damper applications, to employ actuators of the type having an output shaft which is driven in one direction to a desired position and held in that position by an electric motor, and returned in the opposite direction to a rest position by a spring when the motor is not energized. The motor may also serve to govern the speed with which the spring returns the actuator output shaft to its rest position.

Depending on the type of motor used, the motor may offer more or less minimum resistance to operation of the spring return mechanism. This resistance is manifested as a torque in addition to the torque required for returning the damper or other load to its rest position which must be provided by the spring. The speed with which the motor can operate the load is determined by the power output of the motor which is transmitted to the load by a torque multiplying gear train. The resistance or load provided by the motor on the spring in returning the actuator output shaft to its rest position typically increases with increased power output capability of the motor. Thus, it is apparent that optimizing the actuator system for speed of operation and size of controlled load requires careful balancing of the motor output power capability, gear train input/output ratio and return spring strength.

One function of dampers in certain HVAC systems is to provide smoke and fire control. It has become a requirement that actuators used in smoke and fire control applications be capable of operation at an elevated temperature of, for example, 350° F. Operation at elevated temperature introduces additional complications and places additional demands on the actuator system. More specifically, magnetic circuit performance is generally adversely affected by elevated temperature, thus decreasing electric motor power output for a given energization voltage. A requirement for operation at elevated temperatures also places limitations on the electrical circuit design, which effectively precludes use of electronically commutated motors. Finally, elevated temperature application requirements restrict the choice of acceptable materials and lubricants, effectively precluding the use of many plastics and wick-type lubrication systems.

Apart from the foregoing considerations, it is desirable to minimize the energy consumed by the actuator system. In addition to reducing energy costs, this reduces the power handling requirements of circuit components which supply energization current to the motor, and reduces the power required to be dissipated by the motor, thereby permitting use of a motor of smaller size and increasing its life.

The applicant has achieved many of the objectives and operating characteristics indicated as desirable in the foregoing discussion by devising an actuator designed around a DC brush commutated motor. The characteristics of such a motor are used to maximum advantage by providing a unique drive circuit and method of energization which alters the average voltage at which current is supplied to energize the motor based on the actuator operating mode and environmental conditions. This approach has permitted the applicant to provide a fast acting two position spring return actuator designed to be directly coupled to a load. The actuator requires less operating power than conventional actuator designs and is capable of operation at elevated temperatures.

SUMMARY OF THE INVENTION

The present invention is an actuator system, and a drive circuit and method employed therein, the actuator including an electric motor coupled to a rotatable output member which is biased for rotation to a rest position. The motor, when energized, rotates and holds the output member at a position away from the rest position. The drive circuit includes input means for providing current in response to a command for rotation of the shaft away from its rest position, a rotation sensor operable to produce a signal indicative of whether or not the output member is rotating, and a control circuit responsive to current received from the input means and the rotation sensor signal. The control circuit is operable to supply current to the motor at a first average voltage if the output member is rotating, and to supply current to the motor at a second average voltage less than the first average voltage once the output member has stalled. The circuit may also include a temperature sensor operable to produce a signal indicative of a sensed temperature, the control circuit being responsive to the temperature sensor signal to increase voltage at which current is supplied to the motor to a third average voltage greater than the first average voltage if the sensed temperature is greater than a predetermined temperature limit.

The method of the applicant's invention comprises the steps of supplying electric current to the motor when positioning of the output member away from its rest position is desired, sensing whether or not the output member is rotating, controlling the voltage at which current is supplied to the motor to a first average voltage if the output member is rotating, and controlling the voltage at which current is supplied to the motor to a second average voltage less than the first average voltage once the output member has stalled.

DESCRIPTION OF THE PREFERRED EMBODIMENT

Figure 1:
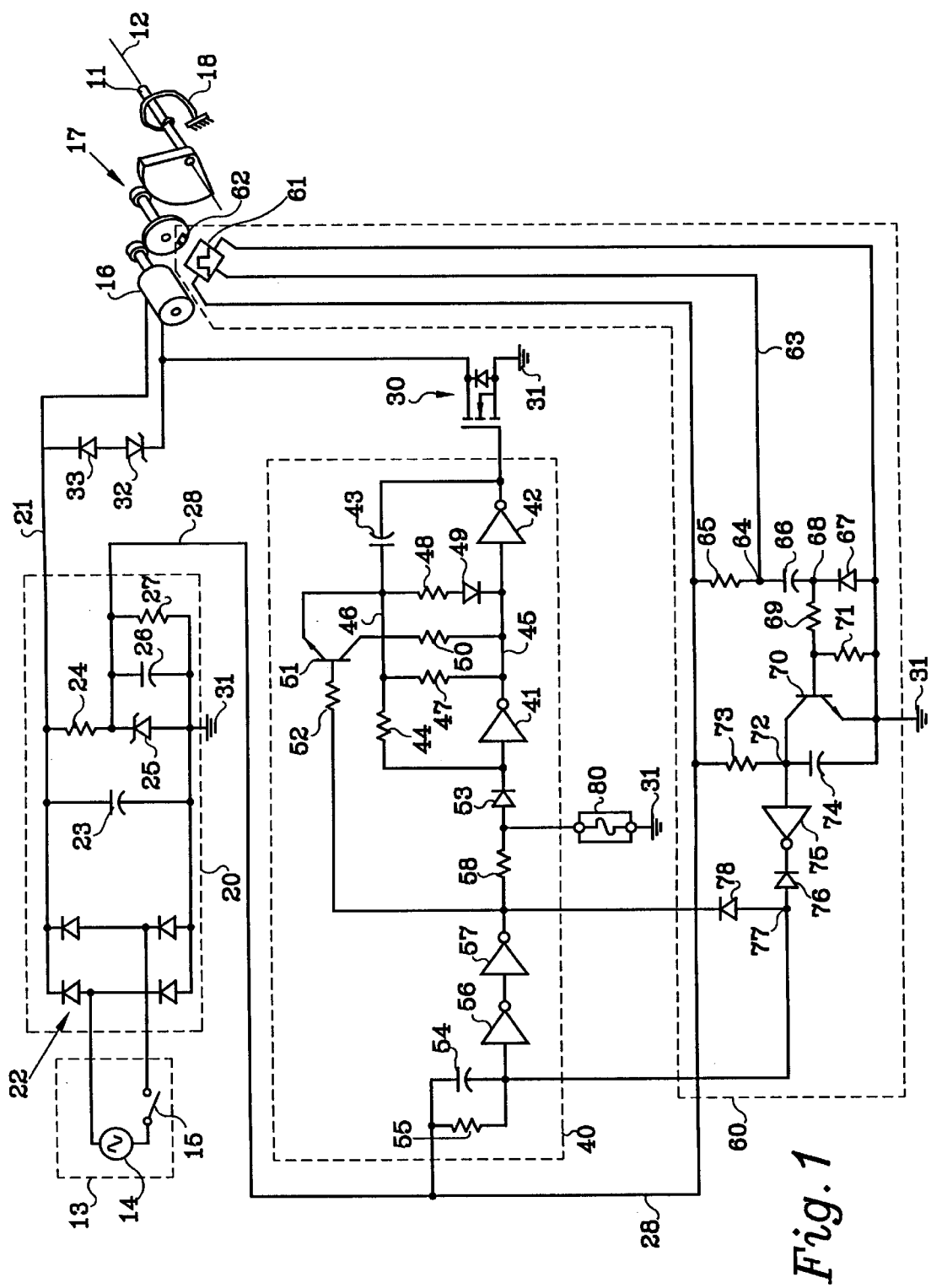
FIG. 1 is a schematic diagram of an actuator system incorporating a preferred circuit for implementing the applicant's invention.

In the schematic diagram of FIG. 1, reference numeral 11 identifies an actuator output member or shaft which is mounted for rotation about an axis 12, and to which a load, such as damper or damper system (not shown) of an HVAC system may be connected for positioning in response to a load control signal provided by control signal apparatus generally identified by reference numeral 13. Control signal apparatus 13 is schematically represented as including an alternating current source 14 in series with a switch 15. In a representative application, and for convenience in describing the applicant's invention, current source 14 may supply current at a voltage of 24 volts AC, and switch 15 may be part of an economizer system, enthalpy sensor, air quality sensor, manually controlled switch or other apparatus which provides a switching function. The economizer system, sensor or other switching apparatus may be implemented with a microprocessor.

Shaft 11 is part of an actuator which includes an electric motor 16 coupled to the shaft through a torque multiplying gear train 17. Shaft 11 is biased to rotate in a first direction by a return spring 18. When motor 16 is not energized, spring 18 is operable to rotate shaft 11 to a rest position. Energizing motor 16 causes shaft 11 to rotate against the bias of spring 18 to an actuated position away from the rest position. The actuated position may be determined by a stop (not shown) associated with gear train 17, shaft 11 or the load connected thereto which causes the motor, gear train and shaft to stall. In the actuator system illustrated in FIG. 1, motor 16 is a DC motor, and preferably a DC brush commutated motor.

When switch 15 is open, spring 18 maintains shaft 11 at its rest position. When it is desired to rotate shaft 11 to its actuated position, switch 15 is closed to provide energization current to motor 16. The energization current is supplied from input device identified by reference numeral 20 through a conductor 21 to a first power terminal of motor 16, and is controlled by a solid state load switch identified by reference numeral 30 connected between a second power terminal of motor 16 and a source of reference potential or ground 31. Load switch 30, which is shown as an N-channel power FET, is controlled by a signal supplied to its gate electrode by a control or modulation circuit 40 which receives operating power through a voltage regulator in input device 20. Modulation circuit 40 also receives a signal indicative of whether or not shaft 11 is rotating from a rotation sensor circuit 60. For purposes which will be described in detail hereinafter, modulation circuit 40 is also connected through a temperature sensor in the form of a temperature sensitive fusible link 80 to ground 31.

Several advantages are gained by controlling the energization supplied to motor 16 at different levels depending on the operating mode (i.e., driving or holding the position of shaft 11) and environmental conditions (i.e., normal or elevated temperature). More specifically, when it is desired to drive shaft 11 to its actuated position under normal temperature conditions, motor 16 is energized at a level which is adequate to cause the motor to overcome the torque bias provided by spring 18 in addition to driving the load. However, the energization level is controlled to limit the motor output to a torque level which does not excessively stress the gear train, output shaft or load.

Once shaft 11 has stalled, the energization provided to motor 16 is reduced to a level only sufficient to ensure that shaft 11 is held in its actuated position. Conversely, when the actuator system is subjected to an elevated temperature, the energization provided to motor 16 is increased to a level sufficient to compensate for the diminished magnetic circuit performance of the motor resulting from the elevated temperature. Thus, energy usage is controlled to a level just sufficient to achieve the required actuator system performance while the stresses on mechanical components are minimized under all operating modes and conditions.

The present invention advantageously employs modulation circuit 40 to provide the appropriate level of energization to motor 16 indicated by the sensed operational mode and environmental conditions. Circuit 40 performs this function generally by controlling the voltage at which current is supplied to motor 16 to a first average voltage level when it is desired to rotate shaft 11 to its actuated position under normal temperature conditions, controlling the voltage at which current is supplied to the motor to a second average voltage level less than the first average voltage level once the motor has stalled, and controlling the voltage at which current is supplied to the motor to a third average voltage level greater than the first average voltage level under elevated temperature conditions. Controlling the voltage at which current is supplied to the motor is accomplished by pulse width modulating the current supplied to the motor at three different duty cycles corresponding to the first, second and third average voltage levels.

Turning to the specifics of a preferred implementation of the present invention, N-channel power FET load switch 30 is shown with its source electrode connected to ground 31 and its drain electrode connected to a second power terminal of motor 16. A Zener diode 32 and a conventional diode 33 are connected in a series anode-to-anode arrangement between the power terminals of motor 16 to provide a current circulation path which limits the voltage induced across the windings of motor 16 when load switch 30 is switched to a non-conducting state. Diodes 32 and 33 also enhance the braking effect provided by motor 16 in its unenergized state on return of shaft 11 to its rest position by spring 18.

Input device 20 is shown including a full wave diode bridge rectifier circuit 22 which provides unidirectional or direct current energization for motor 16. Reference numeral 23 identifies a filter capacitor connected across rectifier circuit 22 between conductor 21 and ground 31.

Rectifier circuit 22 also supplies operating power to modulation circuit 40 and rotation sensor circuit 60 through a voltage regulator including a resistor 24 and a Zener diode 25 connected in series between conductor 21 and ground 31. Zener diode 25 may be chosen to provide a regulated five volt DC output at its junction with resistor 24. Reference numeral 26 identifies a filter capacitor connected across the Zener diode. A resistor 27 is also connected across Zener diode 25 to provide a discharge path for certain capacitors in modulation circuit 40 and rotation sensor circuit 60, as will be described hereinafter. Operating power is transmitted to modulation circuit 40 and rotation sensor circuit 60 through a conductor 28.

Pulse width modulation of the control signal provided to load switch 30 by modulation circuit 40 is achieved by an oscillator comprising series connected inverters 41 and 42 and a feedback path including a capacitor 43 and a resistor 44 connected in series from the output terminal of inverter 42 to the input terminal of inverter 41. Capacitor 43 is alternately charged in opposite polarities through the output terminal of inverter 42 and selected combinations of three current paths which may be of different impedances. The modulation duty cycles are determined by which current path(s) is/are active.

The output terminal of inverter 41 is connected to the input terminal of inverter 42 at a junction 45, the output terminal of inverter 42 supplying the gate signal for load switch 30. Capacitor 43 and resistor 44 are connected at a junction 46. The current paths through which capacitor 43 is charged are connected between junctions 45 and 46. A resistor 47 forms the first current path. A resistor 48 in series with a diode oriented to permit current flow toward junction 45 forms a second current path. A resistor 50 connected through an NPN transistor 51, the emitter of the transistor being connected to junction 46, forms a third current path.

Transistor 51 receives its base control signal from rotation sensor circuit 60 through a resistor 52, as will be described hereinafter.

For purposes of describing operation of the oscillator circuit, assume an operating mode in which the input terminal of inverter 41 has just switched to a logical low state of substantially ground potential, and is essentially isolated from signal levels in upstream parts of modulation circuit 40, as would be the case with the diode identified by reference numeral 53 connected as shown in series with fusible link 80 between the inverter input terminal and ground 31. Also assume that transistor 51 is being maintained in a conductive state by a suitable base control signal.

In such a configuration, as the output of inverter 42 switches to its logical low state, junction 46 initially goes to a corresponding low voltage. Junction 45 is at high voltage corresponding to the logical high states at the output terminal of inverter 41 and input terminal of inverter 42. Charging of capacitor 43 then commences through resistors 47 and 50, the collector-emitter junction of transistor being forward biased. The charging path containing resistor 48 is not active because of the reverse bias across diode 49. Thus, charging of capacitor 43 with the described polarity and the time interval that inverters 41 and 42 remain in their present switched states is determined by resistors 47 and 50.

Once capacitor 43 is sufficiently charged, thereby raising the voltage at junction 46 and producing a logical high state at the input terminal of inverter 41, inverters 41 and 42 switch states, the output of inverter 42 switching to a logical high state. This produces a corresponding increase in the voltage at junction 46, junction 45 being at a logical low state. Capacitor 43 then commences to charge with an opposite polarity through resistors 47 and 48, thereby decreasing the voltage at junction 46. Once the voltage at junction 46 and the input terminal of inverter 41 has decreased sufficiently, inverters 41 and 42 again switch states, the output of inverter 42 going to a logical low state.

In an exemplary actuator system embodiment, it was desired to operate motor 16 in a drive mode and under normal temperature conditions at an average voltage corresponding to an 85% duty cycle modulation level. This modulation duty cycle may be achieved by choosing the values of resistors 47, 48 and 50 such that capacitor 43 charges more slowly through resistors 47 and 48 than through resistors 47 and 50, thus leaving the output of inverter 42 at a logical high state for a longer interval each cycle than at a logical low state.

From the foregoing description, it can be seen that terminating the base signal to transistor 51, thus rendering it non-conducting, eliminates the contribution of the current path containing resistor 50 in increasing the voltage at junction 46. This has the effect of maintaining the output of inverter 42 at a logical low state for a longer portion of each cycle, thus lowering the duty cycle of the gate signal supplied to load switch 30, and reducing the average voltage at which current is supplied to motor 16.

Turning to overall operation of the drive circuit shown in FIG. 1, upon closure of switch 15 to energize motor 16, operating voltage is supplied to modulation circuit 40 and rotation sensor circuit 60 from the voltage regulator in input device 20. This step increase in voltage is supplied to a power-up circuit comprising a capacitor 54 connected in parallel with a resistor 55 to the input terminal of an inverter 56. The output terminal of inverter 56 is connected to the input terminal of an inverter 57, the output terminal of which is connected to a resistor 58 at a junction from which the base control signal is supplied to transistor 51. The step increase in voltage supplied to the power-up circuit is transmitted through resistor 55 to the input terminal of inverter 56 and results in a logical high state at the output terminal of inverter 57. In accordance with the foregoing description, this results in the oscillator operating at a first duty cycle of, for example, less than 95%, and preferably of approximately 85%.

As will be described hereinafter, once output shaft 11 has stalled, rotation sensor circuit 60 forces the output of an inverter 75 to a logical low state. Capacitor 54 is then charged through diode 76, resulting in a logical low state at the input of inverter 56. Until shaft 11 has stalled, the input terminal of inverter 56 and output terminal of inverter 57 remain at logical high states, thereby providing a base control signal to transistor 51 which maintains it in a conducting state. In the absence of signal conditions which maintain a logical high state at the output of inverter 57, the inverter will switch to a logical low output state, thereby rendering transistor 51 non-conducting, and decreasing the operating duty cycle of the oscillator to, for example, 40%, which corresponds to holding mode energization for motor 16.

Figure 2:
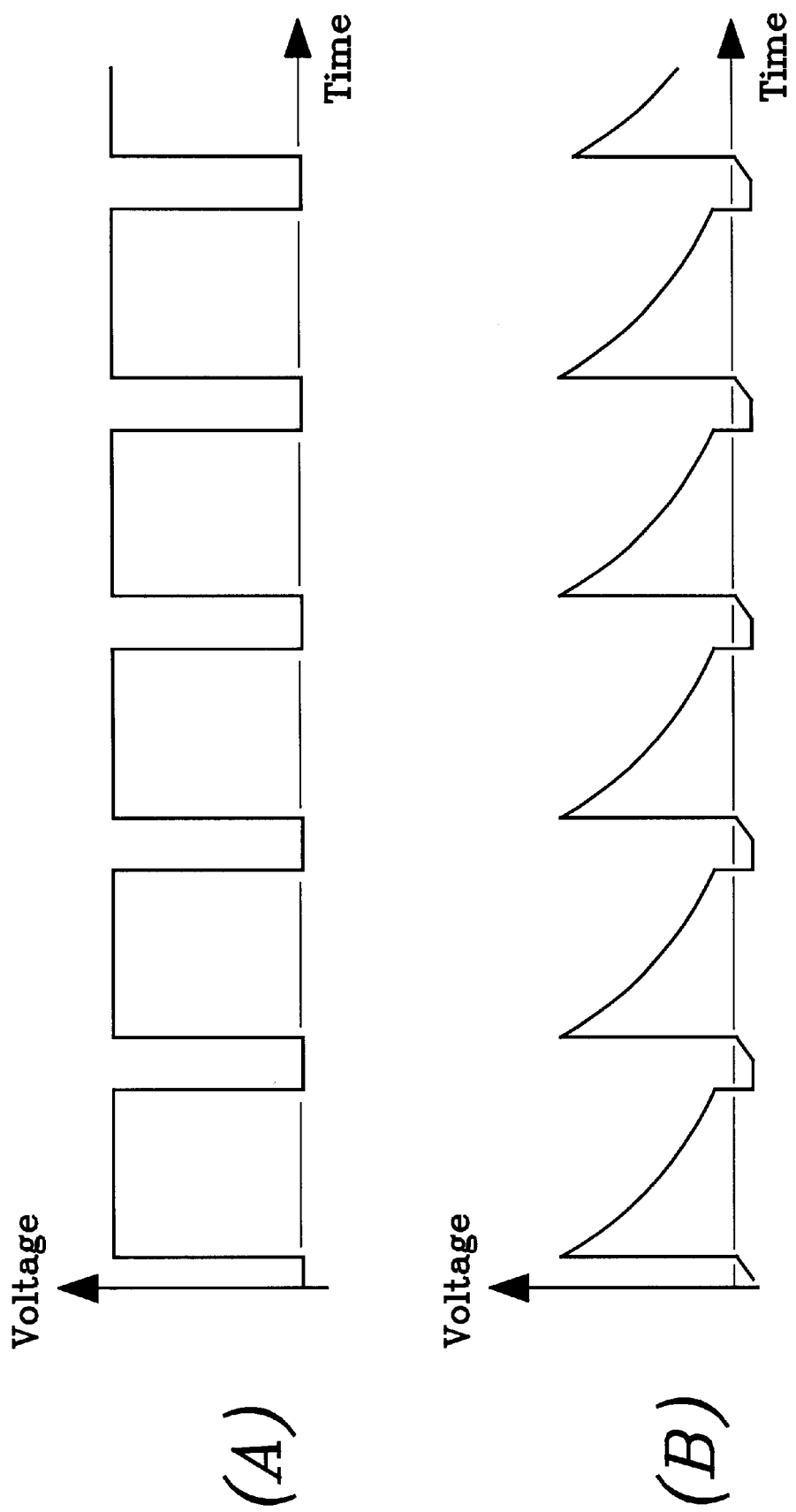
FIGS. 2A and 2B are representations of operating wave forms which occur at selected points in the circuit of FIG. 1 to facilitate understanding of the circuit design and operation.

Rotation sensor circuit 60 includes a pulse generator 61 which may be implemented with a Hall effect device, such as is commercially available under Microswitch model No. SS443A, in cooperation with a magnet 62 which may be mounted near the periphery of a gear or other rotating member in gear train 17. As shown, pulse generator 61 is mounted proximate the rotating member which carries magnet 62, and is energized through connections to conductor 28 and ground 31. When motor 16 and gear train 17 are rotating, magnet 62 periodically passes near pulse generator 61 causing it to produce a high output signal as illustrated in FIG. 2A. The pulse train is carried over a conductor 63 to a junction 64 between a resistor 65 and a capacitor 66, resistor 65 being connected between the junction and conductor 28. Capacitor 66 is connected in series with a diode 67 between junction 64 and ground 31, diode 67 being oriented to permit current flow from ground 31 to a junction 68 between capacitor 66 and diode 67. Capacitor 66 produces a positive going spike at the leading edge of each pulse produced by pulse generator 61, and attempts to produce a negative going spike at the trailing edge of each pulse, the negative going spike being clipped by diode 67 as illustrated in the waveform of FIG. 2B.

The voltage waveform at junction 68 is supplied through a resistor 69 to the base electrode of an NPN transistor 70. The base electrode of transistor 70 is biased to ground potential through a resistor 71, and the emitter electrode of the transistor is connected directly to ground 31. The collector electrode of transistor 70 is connected to a junction 72 between a resistor 73 and a capacitor 74, the resistor being connected between conductor 28 and junction 72 and the capacitor 74 being connected between junction 72 and ground 31. Capacitor 74 is biased through resistor 73 to be charged to the regulated voltage on conductor 28. However, as long as transistor 70 continues to receive the periodic waveform of FIG. 2B resulting from rotation of output shaft 11, the transistor periodically discharges capacitor 74, thereby maintaining junction 72 at a logical low state.

The signal at junction 72 is supplied to inverter 75 whose output terminal is connected to the cathode of a diode 76, the anode of which is connected to a junction 77 which is biased to the voltage on conductor 28 through resistor 55. Thus, junction 77 is maintained at a logical high state as long as the output of inverter 75 is at a logical high state, which is true as long as shaft 11 is rotating. However, if shaft 11 has stalled, the pulse trains in rotation sensor circuit 60 cease and transistor 70 no longer discharges capacitor 74, thus resulting in a logical low state at the output of inverter 75. This forward biases diode 76 and reduces the voltage at junction 77 so that a diode 78 connecting junction 77 to the output terminal of inverter 57 is no longer forward biased. The input of inverter 56 and output of inverter 57 then go to logical low states, which renders transistor 51 non-conducting and reduces the duty cycle of the control signal to load switch 30 and the current supplied to motor 16.

As previously indicated, elevated temperatures generally adversely affect the magnetic circuit performance of motor 16. In applications in which the actuator system is used for smoke and fire control, and depending on the control system configuration, it may be desirable to move a damper connected to output shaft 11 to its actuated position under elevated temperature conditions. The applicant's circuit compensates for decreased motor efficiency under such conditions by increasing the average voltage at which current is supplied to motor 16. This is accomplished by fusible link 80 which opens upon exposure to temperature above a predetermined temperature limit. When fusible link 80 opens, the junction between diode 53 and resistor 58 is no longer held at ground potential. Thus, if the output of inverter 57 is at a logical high state, corresponding to actuation mode energization of motor 16, the input of inverter of inverter 41 remains continuously at a logical high state, thereby providing an unmodulated or 100% duty cycle signal to load switch 30 and supply of current at maximum average voltage to motor 16. Thus, adequate motor output torque is maintained even under elevated temperature conditions.

Although a particular embodiment of the applicant's actuator system, drive circuit and method is shown and described for illustrative purposes, variations of the apparatus and method employed therein will be apparent to those of ordinary skill in the relevant art. It is not intended that the scope of coverage be limited to the illustrated embodiment, but only by the terms of the following claims.

The embodiments of the invention in which an exclusive property or right is claimed are defined as follow:

1. A drive circuit for an actuator having an output shaft, a spring coupled to the shaft operable to bias the shaft for rotation toward a rest position, and an electric motor coupled to the shaft and energizable by electric current at at least a predetermined average voltage to rotate the shaft against the bias of the spring away from the rest position, the spring being operable to return the shaft to the rest position when the motor is not energized, the drive circuit comprising:

input means for providing current at at least the predetermined average voltage when it is desired to rotate the shaft away from the rest position;

a rotation sensor operable to produce a first signal indicative of whether or not the actuator output shaft is rotating; and a modulation circuit operable in response to both current received from said input means and the first signal indicating rotation of the actuator output shaft to supply current at a first average voltage adequate to energize the electric motor to continue to rotate the output shaft away from the rest position against the bias of the spring, and operable in response to current received from said input means to supply current at a second average voltage less than the first average voltage, but sufficient to hold the actuator output shaft in position against the bias of the spring when the first signal indicates that the actuator output shaft has stalled.

2. The drive circuit of claim 1 wherein said modulation circuit is operable to pulse width modulate the current received from said input means, said current being pulse width modulated at a first duty cycle to rotate the output shaft away from the rest position, and at a second duty cycle less than the first duty cycle when the first signal indicates that the actuator output shaft has stalled.

3. The drive circuit of claim 1 for energizing a DC electric motor wherein said input means provides unidirectional current.

4. The drive circuit of claim 3 wherein the first duty cycle is greater than 50% and the second duty cycle is less than 50%.

5. The drive circuit of claim 4 wherein said rotation sensor is implemented with a Hall effect device.

6. The drive circuit of claim 1 wherein:

a temperature sensor is included, said temperature sensor being operable to supply a second signal to said modulation circuit in response to having sensed a temperature above a predetermined temperature limit; and said modulation circuit is operable to supply current at a third average voltage greater than the first average voltage for energizing the electric motor in response to supply of the second signal by said temperature sensor.

7. The drive circuit of claim 6 wherein said modulation circuit is operable to pulse width modulate the current received from the input means, the current being pulse width modulated at a first duty cycle to rotate the actuator output shaft away from the rest position when said temperature sensor has not sensed a temperature above the predetermined temperature limit, the current being pulse width modulated at a second duty cycle less than the first duty cycle when the first signal indicates that the actuator output shaft has stalled, and the current being pulse width modulated at a third duty cycle greater than the first duty cycle to rotate the actuator output shaft away from the rest position cycle in response to said temperature sensor having sensed a temperature above the predetermined temperature limit.

8. The drive circuit of claim 7 wherein said first duty cycle is between 50% and 95%, said second duty cycle is less than 50%, and said third duty cycle is greater than 95%.

9. The drive circuit of claim 8 for energizing a DC electric motor wherein said input means provides unidirectional current.

10. The drive circuit of claim 9 wherein said rotation sensor is implemented with a Hall effect device.

11. A method of energizing an actuator system in which an output shaft is rotated away from a rest position by an electric motor and is returned to the rest by biasing means operable to rotate the shaft when the motor is not energized, the method comprising the steps of:

supplying electric current to the motor when rotation of the output shaft away from its rest position is desired;

sensing whether or not the shaft is rotating;

controlling the average voltage at which current is supplied to the motor to a first level sufficient to sustain rotation of the shaft against the urging of the biasing means if the shaft is rotating; and controlling the average voltage at which current is supplied to the motor to a second level less than the first level, but sufficient to hold the shaft in position against the urging of the biasing means if the shaft has stalled.

12. The method of claim 11 wherein the steps of controlling the average voltages at which currents are supplied to the motor comprise pulse width modulating said currents.

13. The method of claim 12 wherein the electric motor is a DC electric motor and the electric current supplied to the motor is unidirectional electric current.

14. The method of claim 13 wherein the first and second average voltage levels are produced by pulse width modulating the currents supplied to the motor at duty cycles of greater than 50% and less than 50% respectively.

15. The method of claim 11 including the further steps of:
sensing a temperature affecting the actuator system; and
controlling the average voltage at which current is supplied to the motor at a third level greater than the first level if the shaft is not stalled and sensed temperature exceeds a predetermined temperature limit.

16. The method of claim 15 wherein the steps of controlling the average voltages at which currents are supplied to the motor comprise pulse width modulating said currents.

17. An electrically energizable actuator system comprising:
an output member mounted for rotation about an axis;
a biasing element coupled to said output member operable to urge said output member to rotate in a first direction;
an electric motor coupled to said output member operable to rotate said output member in a second direction opposite the first direction against the urging of said biasing element when energized with electric current at at least a first average voltage;
conductors for supplying electric current from a source of electric current at at least the first average voltage;
a rotation sensor operable to produce a first signal indicative of whether or not said output member is rotating; and
a control circuit connected to receive current supplied by said conductors and the first signal from said rotation sensor and to supply energization current to said electric motor, said control circuit being operable to control the voltage at which current is supplied to said electric motor to at least the first average voltage when receiving both current from said conductors and the first signal from said rotation sensor indicates that said output member is rotating, said control circuit further being operable to control the voltage at which current is supplied to said electric motor to a second average voltage less than the first average voltage, but sufficient to hold said output member in position against the urging of said biasing element when receiving both current from said conductors and the first signal from said rotation sensor indicates that said output member has stalled.

18. The electrically energizable actuator system of claim 17 wherein:
said electric motor is a DC electric motor; and
the electric current supplied by said conductors from the source of electric current is unidirectional electric current.

19. The electrically energizable actuator system of claim 18 wherein said electric motor is a DC brush commutated electric motor.

20. The electrically energizable actuator system of claim 19 wherein said control circuit is a modulation circuit operable to pulse width modulate the current supplied to said electric motor at a first duty cycle when the first signal indicates that said output member is rotating, and at a second duty cycle less than the first duty cycle when the first signal indicates that said output member has stalled.

21. The electrically energizable actuator system of claim 20:
further including a temperature sensor operable to produce a second signal indicative of whether or not a sensed temperature has exceeded a predetermined temperature limit; and
wherein said modulation circuit is operable to pulse width modulate the current supplied to said electric motor at a third duty cycle greater than the first duty cycle when the second signal indicates that the sensed temperature has exceeded the predetermined temperature limit.

22. The electrically energizable actuator system of claim 21 wherein said modulation circuit includes an oscillator having a feedback path whose characteristics are modified in response to the first signal from said rotation sensor and the second signal from said temperature sensor.

23. The electrically energizable actuator system of claim 22 wherein said rotation sensor comprises:
a pulse generator operable to produce an electrical pulse train in response to rotation of said output member;
a storage circuit connected to said pulse generator for storing a voltage whose magnitude is dependent on whether or not said pulse generator is producing an electrical pulse train; and
a comparitor for comparing the voltage stored by said storage circuit with a threshold voltage to produce the first signal of said rotation sensor.

24. The electrically energizable actuator system of claim 23 wherein said pulse generator includes a Hall effect switch.

25. The electrically energizable actuator system of claim 24 wherein said temperature sensor includes a temperature responsive fusible link which, when intact, supplies a predetermined reference voltage to said modulation circuit.

26. The electrically energizable actuator system of claim 25 further including a start-up circuit operable to cause said modulation circuit to supply current to said electric motor at at least the first average voltage upon initial supplying of current by said conductors and continuing for a time interval sufficient to permit said output member to commence rotation.

27. In an actuator system of the type including an output shaft rotatable between a rest position and a limiting stop position, a spring biasing the output shaft toward the rest position, and a motor which, when energized with electric current at at least a first average voltage, is operable to rotate the output shaft against the bias of the spring toward the limiting stop position, an improved circuit for supply energization to the motor, comprising:
a supply circuit for selectively supplying electric current to energize the motor;
a rotation sensor for producing a rotation signal indicative of whether the output shaft is rotating; and
a modulation circuit operable to vary the average voltage at which electric current is supplied to the motor by said supply circuit in response to the rotation signal produced by said rotation sensor, the average voltage being sufficient to sustain rotation of the output shaft against the bias of the spring if the rotation signal indicates rotation of the shaft, the average voltage being reduced, but sufficient to hold the output shaft in position against the bias of the spring, if the rotation signal indicates that rotation of the output shaft has ceased.

28. The actuator system of claim 27 further including a temperature sensor connected to said modulation circuit and operable when sensing a temperature above a predetermined temperature limit to cause said modulation circuit to increase the average voltage at which electric current is supplied to the motor.

29. The actuator system of claim 28 further including a startup circuit operable to cause said modulation circuit to supply electric current to the motor at an average voltage sufficient to sustain rotation of the output shaft upon initiation of the supply of current by said supply circuit, and continuing for a time interval sufficient to permit the output shaft to commence rotation.

\* \* \* \* \*